(12) United States Patent
Liu

(10) Patent No.: US 10,712,876 B2
(45) Date of Patent: Jul. 14, 2020

(54) CAPACITIVE TOUCH-ON-SURFACE INPUT APPARATUS WITH TOUCH-FORCE SENSING USING PROFILED CAPACITIVE ELECTRODE

(71) Applicant: TEXAS INSTRUMENTS INCORPORATED, Dallas, TX (US)

(72) Inventor: Dongtai Liu, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/391,497

(22) Filed: Dec. 27, 2016

(65) Prior Publication Data

US 2017/0185186 A1    Jun. 29, 2017

Related U.S. Application Data

(60) Provisional application No. 62/271,260, filed on Dec. 27, 2015.

(51) Int. Cl.
*G06F 3/044* (2006.01)
*G06F 3/041* (2006.01)

(52) U.S. Cl.
CPC .... *G06F 3/044* (2013.01); *G06F 2203/04105* (2013.01); *G06F 2203/04106* (2013.01)

(58) Field of Classification Search
CPC .. G06F 3/04883; G06F 3/0416; G06F 3/0412; G06F 3/0414; G06F 3/04847; G06F 3/0482; G06F 2203/014; G06F 2203/04106; G06F 2203/04105; G06F 2203/04808; G06F 3/044
See application file for complete search history.

(56) References Cited

U.S. PATENT DOCUMENTS 9,262,031 B1 * 2/2016 Moon ............. G06F 3/044
2017/0068348 A1 * 3/2017 Kemppinen ...... G06F 3/044
2017/0131828 A1 * 5/2017 Matta ............. G06F 3/0412

FOREIGN PATENT DOCUMENTS

WO   WO 2011/142332   * 11/2011

* cited by examiner

*Primary Examiner* — Md Saiful A Siddiqui
(74) *Attorney, Agent, or Firm* — Ray A. King; Charles A. Brill; Frank D. Cimino

(57) ABSTRACT

A device (such as for mobile communications) including a capacitive touch-on-surface (ToS) display adapted for capacitive touch-force sensing. A ToS capacitive sensor includes a profiled capacitive sensor electrode, intermediate and spaced from parallel ground plates by elastomeric insulator/dielectric spacer elements. The profiled capacitive sensor electrode has a non-uniform density profile that is relatively lower near a center of the electrode, and relatively higher near edges of the electrode, for example, equalizing touch-force sensitivity such that sensitivity to a touch-force deflection is substantially uniform across the profiled capacitive electrode. Capacitive sensor electronics coupled to the profiled capacitive sensor electrode measures a touch-force deflection of the ToS display panel based on a resulting touch-force deflection of the profiled capacitive electrode, such that the combined distance between the profiled capacitive sensor electrode and the ground electrodes is reduced by compression of the elastomeric spacer elements.

15 Claims, 3 Drawing Sheets

(3 of 3 Drawing Sheet(s) Filed in Color)

124A

124B

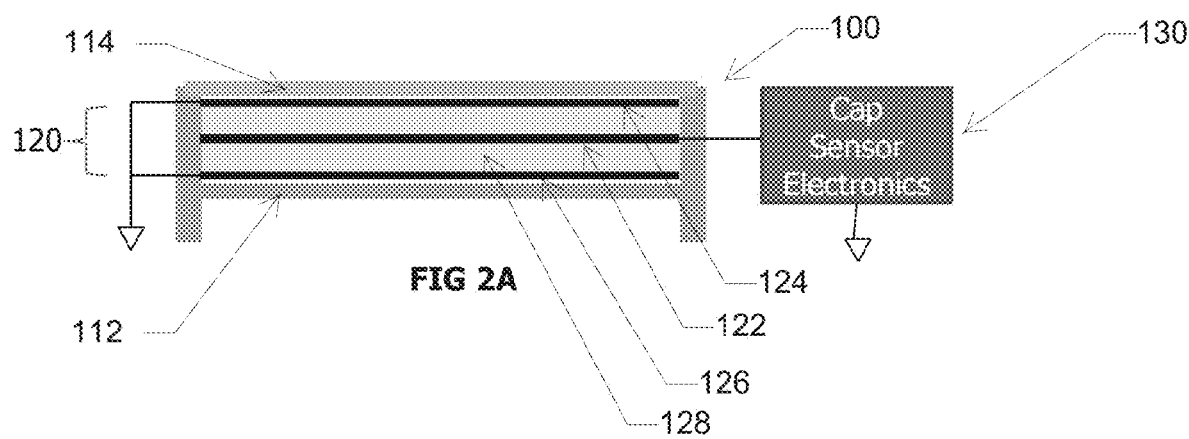
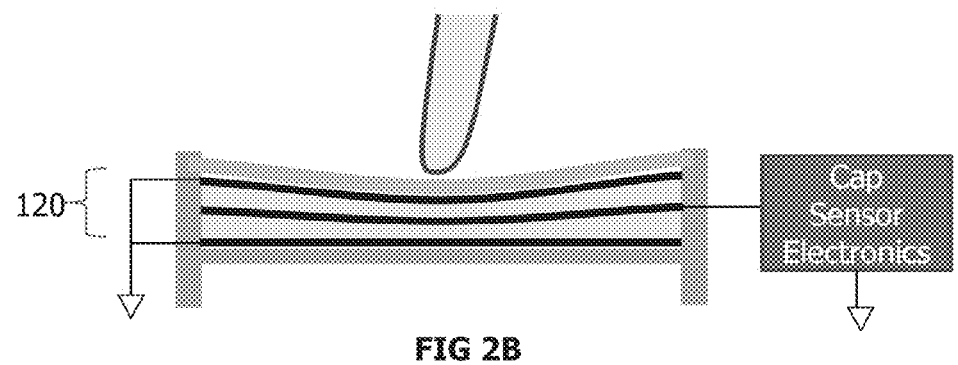
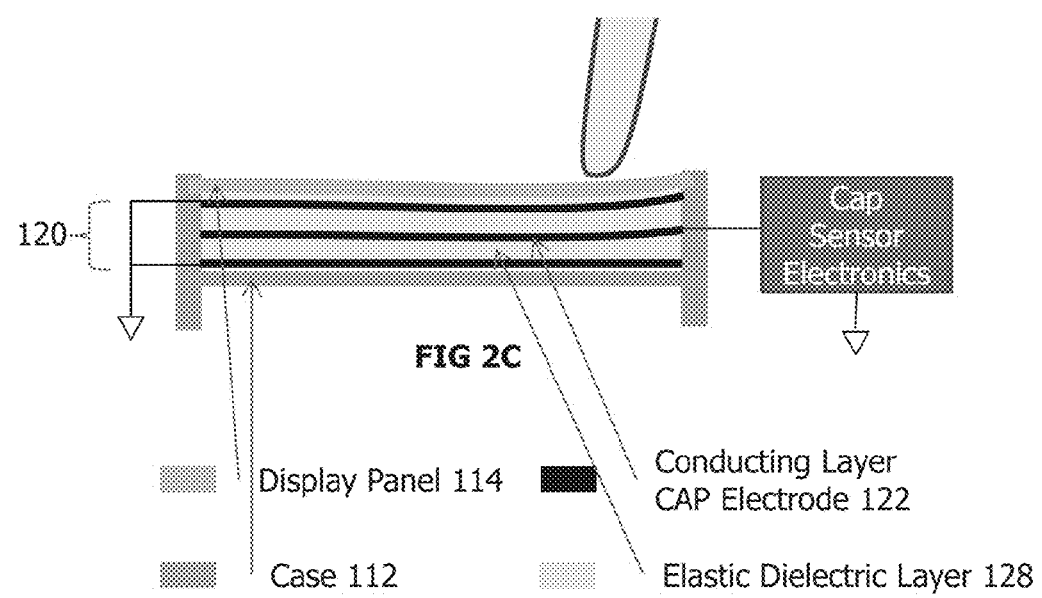

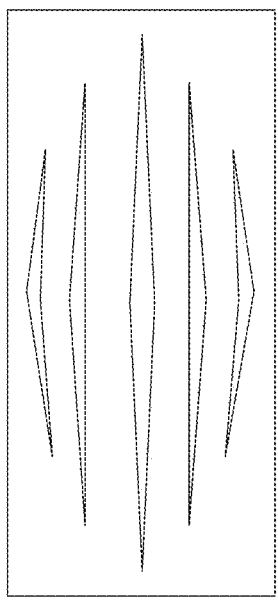
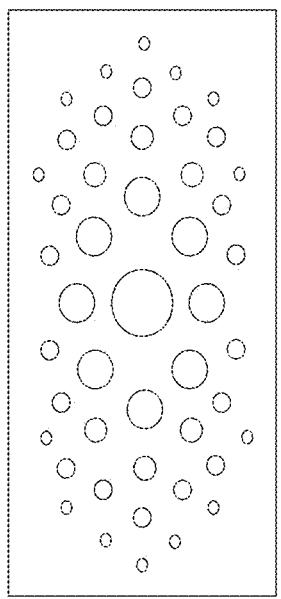
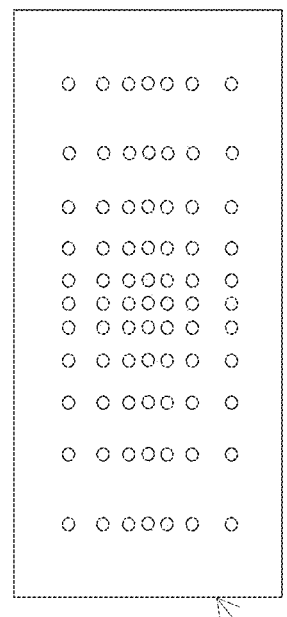
FIG 3 —124A    FIG 4 —124B    FIG 5 —124C
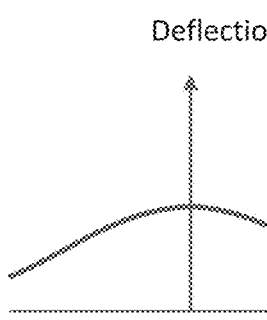
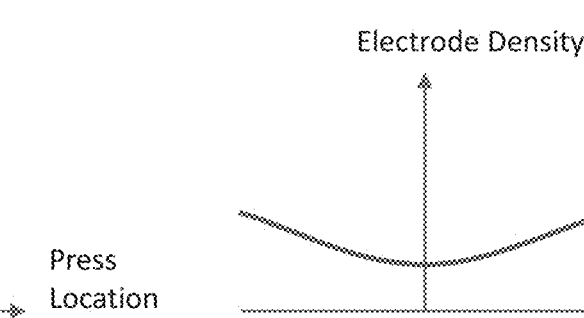
FIG 6A    FIG 6B
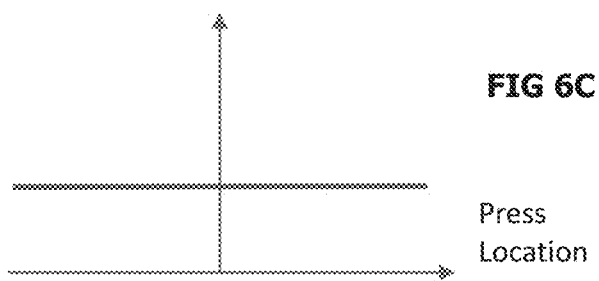
FIG 6C

CAPACITIVE TOUCH-ON-SURFACE INPUT APPARATUS WITH TOUCH-FORCE SENSING USING PROFILED CAPACITIVE ELECTRODE

CROSS-REFERENCE TO RELATED APPLICATIONS

Priority is claimed under 37 CFR 1.78 and 35 USC 119(e) to U.S. Provisional Application 62/271,260, filed 27 Dec. 2015), which is incorporated by reference.

BACKGROUND

Technical Field

This Patent Disclosure relates generally to touch-on-surface (ToS) input, such as for mobile communication devices, and more particularly to capacitive ToS sensing.

Related Art

In mobile devices (and other equipment), capacitive ToS technology is used to provide input/control to a device with a display (glass) panel/screen.

Capacitive ToS sensing detects XY position and movement of a finger (body) touch on a ToS touch surface defined by the display panel. Capacitive ToS sensing is based on a capacitive electrode disposed behind and spaced from the ToS display surface, and driven to project an electric sensing field in the direction of the ToS display surface, so that touch input through the ToS display surface is detected as a changed in capacitance measured by the capacitive electrode.

While this Background information references mobile communication devices, the Disclosure is more generally directed to applications of capacitive ToS sensing.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for a capacitive touch-on-surface (ToS) sensing, including touch-force sensing based on a profiled capacitive electrode, such as can be used in a mobile communications device.

According to aspects of the Disclosure, the methodology for capacitive ToS sensing, including touch-force sensing based on a profiled capacitive electrode, includes using a ToS capacitive sensor adjacent the ToS display panel, the ToS capacitive sensor including a profiled capacitive sensor electrode plate disposed intermediate two ground plates coupled to ground in a parallel plate arrangement, with the capacitive sensor electrode plate spaced from the ground plates by respective elastomeric insulator spacer elements, wherein the profiled capacitive sensor electrode can be configured with a density profile such that sensitivity to a touch-force deflection of the profiled capacitive sensor electrode is substantially uniform across the electrode. The profiled capacitive sensor electrode is configured with a density profile that is relatively lower near a center of the electrode, and relatively higher near the edges of the electrode. Touch-force sensing is accomplished by measuring a touch-force deflection of the ToS display panel based on a resulting touch-force deflection of the profiled capacitive electrode relative to the ground electrode.

According to aspects of the Disclosure, ToS capacitive sensing, including touch-force sensing, is accomplished by measuring a touch-force deflection of the ToS display surface manifested as a corresponding deflection of the profiled capacitive sensor electrode and the ground electrodes, such that combined distance between the capacitive sensor electrode and the ground electrodes is reduced by compression of the elastomeric spacer elements.

Other aspects and features of the invention claimed in this Patent Document will be apparent to those skilled in the art from the following Disclosure.

BRIEF DESCRIPTION OF THE DRAWINGS

Notice Color Drawings:

This Application contains at least one drawing in color. Copies of this Application with color drawings will be provided by the Office upon request and payment of the necessary fee.

FIG. 2A illustrates a capacitive touch-on-surface (ToS) sensing apparatus with touch-force sensing, including a ToS capacitive sensor assembly [120] with a parallel-plane capacitive electrode [122], implementing ToS position (XY) and force (Z) sensing in a device [110] including a display panel [114] that defines a ToS panel surface.

FIGS. 2B-2C illustrate, for the capacitive ToS sensing apparatus of FIG. 2A, capacitive ToS touch-force sensing, that: (2B) a touch-force (Z) deflection near the center of the ToS display surface [114] causes a larger deflection of the ToS display surface, than (2C) a touch-force deflection near an edge of the ToS display surface.

FIGS. 3-5 illustrate example embodiments of a profiled capacitive electrode [122A, 122B, 122C] for use in a ToS capacitive sensor assembly including ToS touch-force (Z) according to this Disclosure, each with a pre-defined cut-out pattern having a density of the conductive area that is less in the middle (where defection is highest) and greater near the edges (where deflection is less).

FIGS. 6A-6C are example plots illustrating ToS touch-force (Z) sensing in which touch-press location on a ToS display surface is counterbalanced by a profiled capacitive electrode configuration with profiled electrode conductive area density to provide a combined substantially uniform touch-force sensitivity according to this Disclosure.

DETAILED DESCRIPTION

This Description and the Drawings constitute a Disclosure for capacitive touch-on-surface (ToS) input apparatus with touch-force sensing using a profiled capacitive electrode, including describing example embodiments, and illustrating various technical features and advantages.

Figure 1:
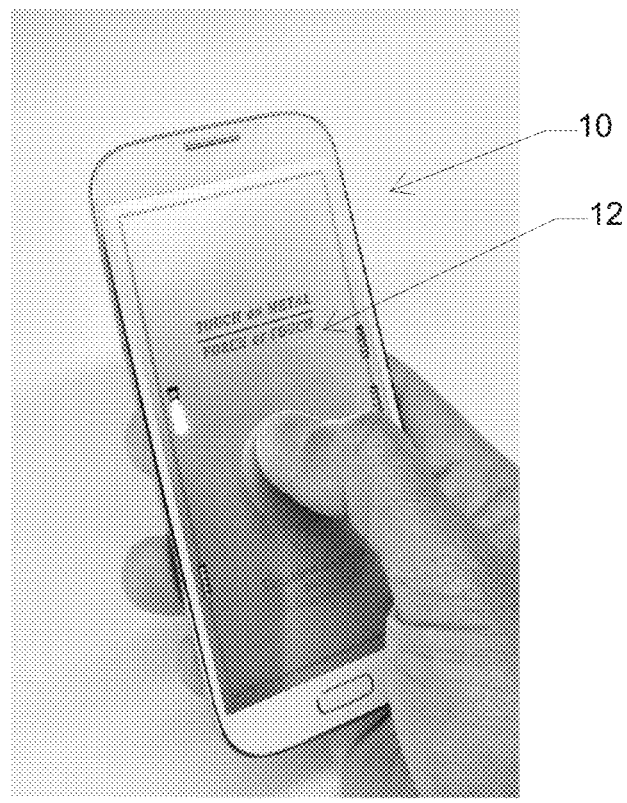
FIG. 1 illustrates an example embodiment of a mobile communications device [10] including a display panel [14], adaptable for capacitive touch-on-surface (ToS) sensing, including touch-force sensing, according to this Disclosure.

FIG. 1 illustrates an example embodiment of a mobile communications device 10, including a case 12 and a capacitive touch display panel 14. Device 10 and capacitive touch display panel 14 can be adapted for capacitive ToS sensing, including touch-force sensing, according to this Disclosure.

FIG. 2A illustrates a capacitive ToS sensing apparatus with touch-force sensing, implemented in a device 100 including a case 112 and ToS display panel 114. Capacitive ToS sensing apparatus includes a ToS capacitive sensor assembly 120 coupled to capacitive sensor electronics 130. The capacitive ToS sensing apparatus implements ToS position (XY) and force (Z) sensing.

ToS capacitive sensor assembly 120 incudes parallel-plane capacitor electrode/ground plates, with a capacitive sensor electrode 122 disposed intermediate ground electrodes 124 and 126, separated by insulator/dielectric elastomeric (compressible) spacer elements 128, such as elastomeric foam. As further described in connection with FIGS. 3-5 and FIGS. 6A-6C, for capacitive ToS sensing including touch-force sensing according to this Disclosure, capacitive electrode 122 is configured with a non-uniform profiled conductive area/density the substantially equalizes touch-force (Z) sensitivity across the capacitive electrode (based on a non-uniform density profile), and therefore across the ToS display.

FIGS. 2B-2C illustrate, for the capacitive ToS sensing apparatus of FIG. 2A, capacitive ToS touch-force sensing, as affected by XY position on the ToS display surface 114. FIG. 2B illustrates a touch-force (Z) deflection near the center of the ToS display surface 114, and FIG. 2C illustrates a touch-force deflection near an edge of the ToS display surface.

Due to the support around the edges to the ToS display panel 122, for a given touch-force (Z), the deflection near the center (XY) of the ToS display panel is significantly greater than that near the edges (XY), resulting in non-uniform touch force sensitivity across the screen.

Note that touch-force deflection (Z) of the ToS display surface 114 causes a corresponding deflection of the ToS capacitive electrode assembly, capacitive electrode 122 and ground electrodes 124/126. As a result, the elastomeric spacer elements 128 are compressed, thereby reducing the combined distance between the capacitive electrode 122 and the ground electrodes 124/126.

In brief overview, according to aspects of the Disclosure, a device (such as for mobile communications) includes a capacitive touch-on-surface (ToS) display adapted for capacitive touch-force sensing. A ToS capacitive sensor includes a profiled capacitive sensor electrode, intermediate and spaced from parallel ground plates by elastomeric insulator/dielectric spacer elements. The profiled capacitive sensor electrode has a non-uniform density profile that is relatively lower near a center of the electrode, and relatively higher near edges of the electrode, for example, equalizing touch-force sensitivity such that sensitivity to a touch-force deflection is substantially uniform across the profiled capacitive electrode. Capacitive sensor electronics coupled to the profiled capacitive sensor electrode measures a touch-force deflection of the ToS display panel based on a resulting touch-force deflection of the profiled capacitive electrode, such that the combined distance between the profiled capacitive sensor electrode and the ground electrodes is reduced by compression of the elastomeric spacer elements.

FIGS. 3-5 illustrate example embodiments of a profiled capacitive electrode, respectively 122A, 122B, 122C, for use in a ToS capacitive sensor assembly including ToS touch-force (Z) according to this Disclosure. Each profiled capacitive electrode is configured with a pre-defined cut-out pattern having a non-uniform density of the conductive area that is less in the middle (where defection is highest) and greater near the edges (where deflection is less), thereby substantially equalizing touch-force sensitivity such that sensitivity to a touch-force deflection is substantially uniform across the profiled capacitive electrode.

As described further in connection with FIGS. 6A-6C, a profiled capacitive electrode is configurable for capacitive touch force sensing in which touch-force sensitivity is substantially uniform across the ToS display surface 114 (across the profiled capacitive electrode 122) due to a non-uniform density profile for the capacitive electrode.

Configuration/cut-out patterns for the profiled capacitive electrodes 122 are design choice based on system design constraints/requirements. As illustrated in by the example configurations 124A, 124B, 124C, the electrode profile is characterized by a density of the conductive area that is less in the middle (where defection is highest) and greater near the edges (where deflection is less).

FIGS. 6A-6C are example plots illustrating ToS touch-force (Z) sensing in which touch-press location on a ToS display surface is counterbalanced by a profiled capacitive electrode configuration with a non-uniform density profile. FIG. 6A illustrates deflection as a function of position (XY) on the ToS display surface, with deflection greater in the center, and constrained near the edges. FIG. 6B illustrates electrode density across (XY) a profiled capacitive electrode, with electrode conductive area density greater near the edges than near the center of the profiled capacitive electrode.

FIG. 6C illustrates a combined substantially uniform touch-force sensitivity (Z) across the profiled capacitive sensor (XY), according to this Disclosure. As a result, capacitive touch-force measurements (capacitance referenced to ground) by the capacitive sensor electronics (FIGS. 2A-2C, 130) can sense substantially uniform touch-force sensitivity (Z) across the ToS display surface (across the profiled capacitive electrode XY).

Figure 7:
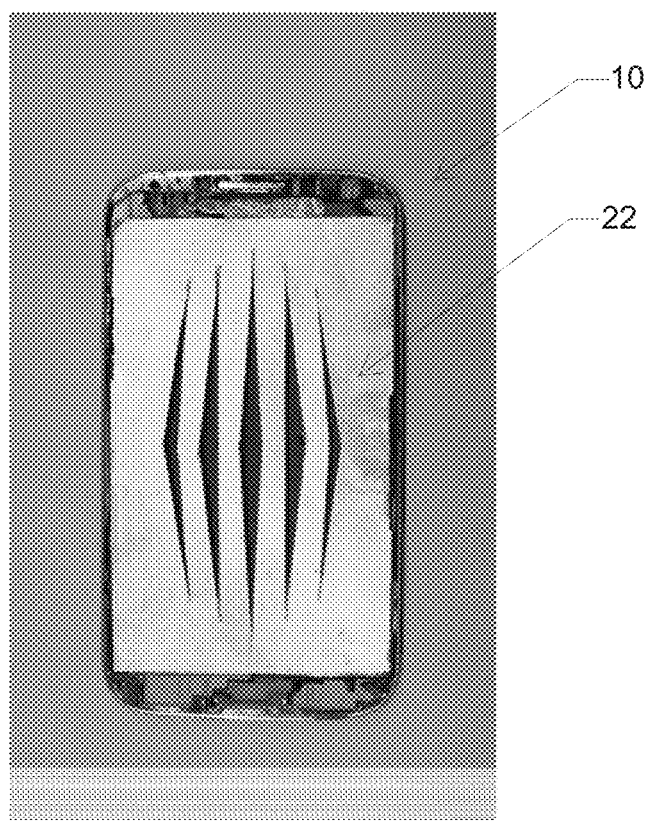
FIG. 7 illustrates an example embodiment of a mobile communications device [10], in which the ToS capacitive sensor assembly is partially assembled to show a profiled capacitive electrode [14A], for capacitive ToS touch-force sensing according to this Disclosure.

FIG. 7 illustrates an example embodiment of a mobile communications device 10, in which the ToS capacitive sensor assembly is partially assembled to show a profiled capacitive electrode 14A, for capacitive ToS touch-force sensing according to this Disclosure.

A capacitive ToS sensor including a profiled capacitive electrode construction/configuration according to this Disclosure avoids a requirement for multiple sensors to achieve substantially uniform touch-force sensitivity.

The Disclosure provided by this Description and the Figures sets forth example embodiments and applications illustrating aspects and features of the invention, and does not limit the scope of the invention, which is defined by the claims. Known circuits, connections, functions and operations are not described in detail to avoid obscuring the principles and features of the invention. These example embodiments and applications, can be used by ordinarily skilled artisans as a basis for modifications, substitutions and alternatives to construct other embodiments, including adaptations for other applications.

The invention claimed is:

1. A device including a touch-on-surface (ToS) display panel adapted for capacitive touch-force (Z) sensing, comprising:
  a device case;
  a capacitive ToS display panel supported around edges by the device case;
  a ToS capacitive sensor assembly in contact with the ToS display panel, including a profiled capacitive sensor electrode configured with a defined cutout pattern creating a density profile for the profiled capacitive sensor electrode that is relatively lower near a center of the electrode, and relatively higher near the edges of the electrode; and capacitive sensor electronics coupled to the profiled capacitive sensor electrode to measure a touch-force deflection (Z) of the ToS display panel based on a resulting touch-force (Z) deflection of the profiled capacitive electrode relative to ground electrodes.

2. The device of claim 1, wherein the profiled capacitive sensor electrode is configured with a density profile such that sensitivity to a touch-force (Z) deflection of the profiled capacitive sensor electrode is substantially uniform across the electrode.

3. The device of claim 1, wherein the capacitive sensor electronics measures the touch-force deflection (Z) of the ToS display panel based on a change in capacitance of the profiled capacitive sensor electrode.

4. The device of claim 1, wherein a touch press of the ToS display surface causes a corresponding deflection of the profiled capacitive sensor electrode and the ground electrodes such that combined distance between the capacitive sensor electrode and the ground electrodes is reduced by compression of the elastomeric spacer elements.

5. The device of claim 1, the ToS capacitive sensor assembly further including:
two ground plates coupled to ground,
the profiled capacitive sensor electrode plate and the ground plates in a parallel plan arrangement with the capacitive sensor electrode plate spaced from the ground plates by respective elastomeric insulator spacer elements.

6. An ToS capacitive sensor assembly suitable for use in a device including a touch-on-surface (ToS) display panel, comprising:
the ToS capacitive sensor assembly configured for contact with the ToS display panel, and including:
a profiled capacitive sensor electrode configured with a defined cut-out pattern creating a density profile for the profiled capacitive sensor electrode that is relatively lower near a center of the electrode, and relatively higher near edges of the electrode; and
capacitive sensor electronics coupled to the profiled capacitive sensor electrode to measure a touch-force deflection (Z) of the ToS display panel based on a corresponding the touch-force deflection (Z) of the profiled capacitive sensor electrode relative to ground electrodes.

7. The assembly of claim 6, wherein the profiled capacitive sensor electrode is configured with a density profile such that sensitivity to a touch-force (Z) deflection of the profiled capacitive sensor electrode is substantially uniform across the electrode.

8. The assembly of claim 6, wherein the capacitive sensor electronics measures the touch-force deflection (Z) of the ToS display panel based on a change in capacitance of the profiled capacitive sensor electrode.

9. The assembly of claim 6, wherein a touch press of the ToS display surface causes a corresponding deflection of the profiled capacitive sensor electrode and the ground electrodes such that combined distance between the capacitive sensor electrode and the ground electrodes is reduced by compression of the elastomeric spacer elements.

10. The assembly of claim 6, wherein:
the profiled capacitive sensor electrode plate is disposed intermediate two ground plates coupled to ground, configured in a parallel plane arrangement, with the capacitive sensor electrode plate spaced from the ground plates by respective elastomeric insulator spacer elements.

11. A method suitable for measuring a touch-force (Z) deflection of a touch-on-surface (ToS) display panel based on capacitive touch-force (Z) sensing, comprising:
disposing a ToS capacitive sensor assembly in contact with the ToS display panel, the ToS capacitive sensor assembly including a profiled capacitive sensor electrode plate;
configuring the profiled capacitive sensor electrode with a defined cut-out pattern creating a density profile for the profiled capacitive sensor electrode that is relatively lower near a center of the electrode, and relatively higher near the edges of the electrode; and
measuring a touch-force deflection (Z) of the ToS display panel based on a resulting touch-force (Z) deflection of the profiled capacitive electrode relative to the ground electrodes.

12. The method of claim 11, wherein the profiled capacitive sensor electrode is configured with a density profile such that sensitivity to a touch-force (Z) deflection of the profiled capacitive sensor electrode is substantially uniform across the electrode.

13. The method of claim 11, wherein touch-force deflection (Z) of the ToS display panel is measured based on a change in capacitance of the profiled capacitive sensor electrode.

14. The method of claim 11, wherein a touch-force deflection (Z) of the ToS display surface causes a corresponding deflection of the profiled capacitive sensor electrode and the ground electrodes, such that combined distance between the capacitive sensor electrode and the ground electrodes is reduced by compression of the elastomeric spacer elements.

15. The method of claim 11, wherein:
the profiled capacitive sensor electrode plate is disposed intermediate two ground plates coupled to ground in a parallel plate arrangement, with the capacitive sensor electrode plate spaced from the ground plates by respective elastomeric insulator spacer elements.

* * * * *